C. W. Bryan.
Calendar.

No. 3,306. Reissued Feb. 23, 1869.

Witnesses

C. Bakewell

L. L. Davis

Inventor.

Clark W. Bryan by his attys

Gardner & Hyde

N. PETERS, PHOTO-LITHOGRAPHER, WASHINGTON, D. C.

UNITED STATES PATENT OFFICE.

CLARK W. BRYAN, SAMUEL BOWLES, B. F. BOWLES, AND J. F. TAPLEY, OF SPRINGFIELD, MASSACHUSETTS, ASSIGNEES OF CLARK W. BRYAN.

IMPROVEMENT IN OFFICE-CALENDARS.

Specification forming part of Letters Patent No. 62,313, dated February 26, 1867; antedated December 11, 1866; reissue No. 3,306, dated February 23, 1869.

*To all whom it may concern:*

Be it known that CLARK W. BRYAN, of Springfield, in the county of Hampden and State of Massachusetts, has invented certain new and useful Improvements in Calendars; and that the following is a full, clear, and exact description thereof, reference being had to the accompanying drawings, making part of this specification, and to the letters of reference marked thereon, in which—

Figure 1:
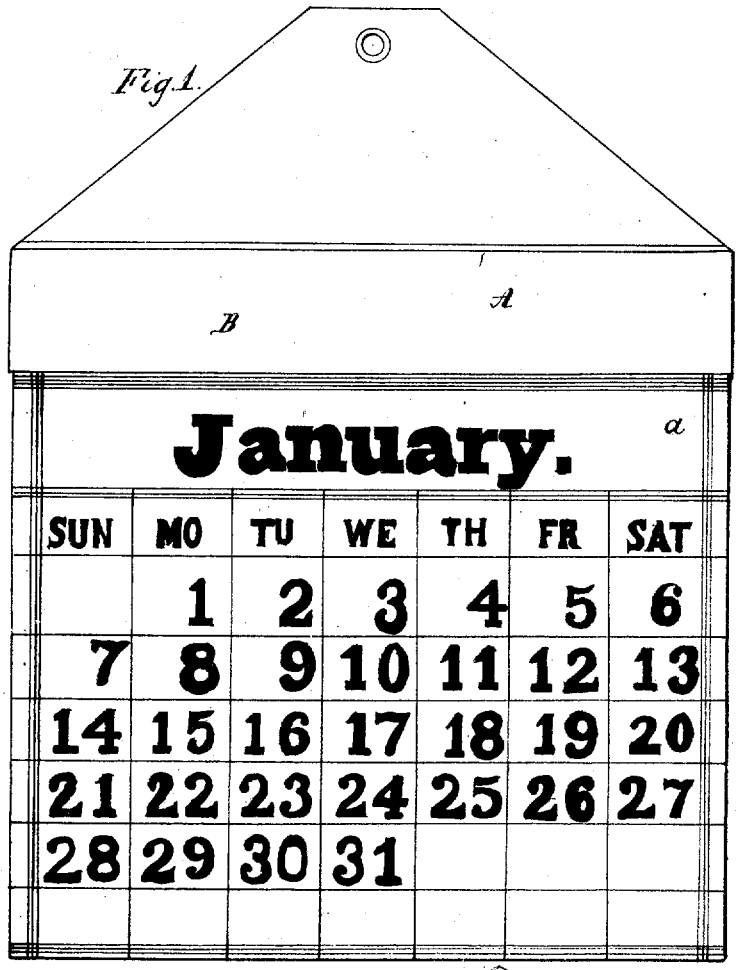
Figure 2:
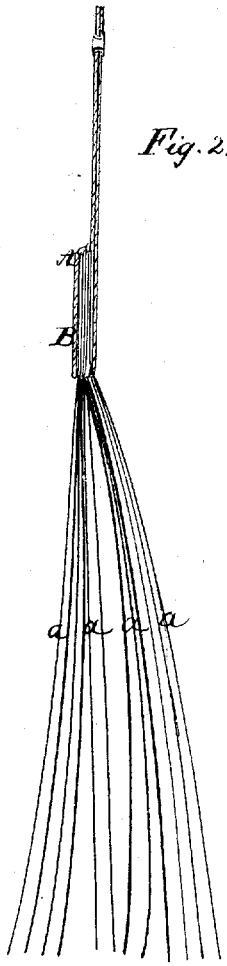
Figure 3:
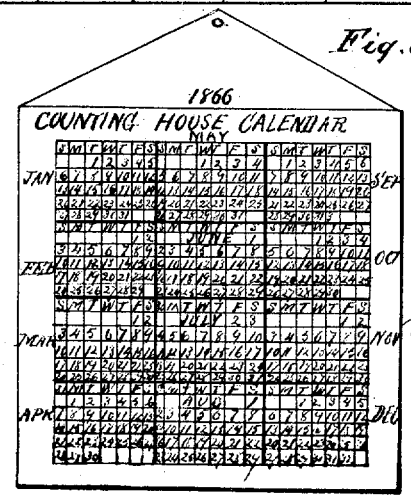

Figure 1 is a front view of the invention. Fig. 2 is a vertical transverse section, and Fig. 3 is a rear view of the same.

This invention relates to the calendar commonly used for office purposes, and consists in arranging together sheets or pieces of paper, each having printed thereon the month, days of the month, days of the week, &c., and in so attaching said sheets together that the front sheet, when no longer required, may be easily torn from the remainder of the calendar leaving the next sheet exposed, and so on to the last sheet.

That others may be able to make and use the invention, we will describe its construction and use.

In the drawings, *a a* represent the sheets of paper, each having one of the months printed thereon, together with the day of the month and day of the week, and they are attached together, and also secured to a top or head piece, A, the front part of which may be made of card-board, or of any other convenient and sufficiently strong material, and, if desirable, the back of said top A may have paper either pasted or sewed thereon, or otherwise conveniently secured, covering also the upper edges of the sheets *a*, in order to give the back a somewhat smooth and even surface. The printed sheets may be attached together and to the top or head piece A by sewing, paste, glue, or by any other desirable and convenient means. When the month has expired which the outside sheet represents, said sheet is easily and quickly torn off by pulling the sheet evenly against the lower edge of said top A. By this arrangement, the month, day of the month, and day of the week may be printed quite large, so that they may be seen at a distance, while the calendar is still in a compact form. Those portions of the sheets, upon their faces, not occupied by figures or other printed characters, may have business-cards printed thereon, or other matter, thus furnishing an excellent medium of advertising. The last or back sheet may have printed upon the back side the counting-house calendar represented in Fig. 3, in which arrangement is included all the months of the year, days of the month, and days of the week. This is very convenient, as it is quite often desirable to refer to a month which is past, the sheet representing that month having been torn off. When the printed sheets are attached to the top by sewing or stitching, said line of stitching may assist somewhat in tearing off the outside sheet; and it is obvious that various methods of attaching the sheets may be practiced, without in the least departing from the principle of operation, the object of the invention being to attach small sheets together which have previously been printed for a calendar in suitably large characters, in such manner as to tear off the outside sheet easily and quickly, when desirable.

Having therefore described the invention, what we claim as new, and desire to secure by Letters Patent, is—

1. A calendar constructed of several printed sheets, attached together, and also to the top A, in the manner described, for the purpose of readily tearing off the outside sheet, or the sheet representing any past month, substantially as herein set forth.

2. The attachment of the counting-house calendar to the back of the last of a series of printed sheets forming a calendar, substantially as herein described and specified.

CLARK W. BRYAN,
SAML. BOWLES,
B. F. BOWLES,
J. F. TAPLEY,
*Assignees of Clark W. Bryan.*

Witnesses:
T. A. CURTIS,
T. C. BAILEY.